United States Patent [19]

Cheo et al.

[11] Patent Number: 4,707,060

[45] Date of Patent: Nov. 17, 1987

[54] BROADBAND INFRARED ELECTRO-OPTIC MODULATOR HAVING A BURIED MICROSTRIP NETWORK

[75] Inventors: Peter K. Cheo; Meyer Gilden, both of West Hartford, Conn.

[73] Assignee: United Technologies Corporation, Hartford, Conn.

[21] Appl. No.: 720,112

[22] Filed: Apr. 4, 1985

[51] Int. Cl.$^4$ .............................................. G02B 6/12
[52] U.S. Cl. ............................... 350/96.14; 350/96.12
[58] Field of Search .............. 350/96.12, 96.13, 96.14, 350/96.15, 355, 356; 372/12, 26, 64

[56] References Cited

U.S. PATENT DOCUMENTS

| 4,124,270 | 11/1978 | Cheo ................................ | 350/96.12 |
| 4,169,009 | 9/1979 | Wagner et al. ..................... | 156/636 |
| 4,208,091 | 6/1980 | Cheo et al. ........................ | 350/96.13 |

OTHER PUBLICATIONS

P. K. Cheo, *Frequency Synthesized and Continuously Tunable IR Laser Source in 9–11 μm*, IEEE Journal of Quantum Electronics, vol. QE-20, No. 7, Jul. 1984.
P. K. Cheo, et al, *Infrared Electrooptic Waveguides*, IEEE Journal of Quantum Electronics, vol. QE-13, No. 4, Apr. 1977.
P. K. Cheo, et al, *Continuous Tuning of 12 GHz in Two Bands of $CO_2$ Laser Lines*, Optics Letters, vol. 1, No. 1, Jul. 1977.
P. K. Cheo, *Generation and Applications of 16 GHz Tunable Sidebands from a $CO_2$ Laser*, Laser Spectroscopy III, Edition by J. L. Hall and J. L. Carlsten, Springer Verlag, Berlin Heidelberg, New York, pp. 394–401, 1977.

Primary Examiner—William L. Sikes
Assistant Examiner—Akm E. Ullah
Attorney, Agent, or Firm—J. Kevin Grogan

[57] ABSTRACT

A microwave infrared modulator having a novel three dimensional structure is presented. The modulator includes a waveguide and metal base with a dielectric wafer buried therebetween. The buried wafer allows for conventional microstrip structures to be employed with larger microstrip electrode dimensions than would otherwise be possible.

7 Claims, 4 Drawing Figures

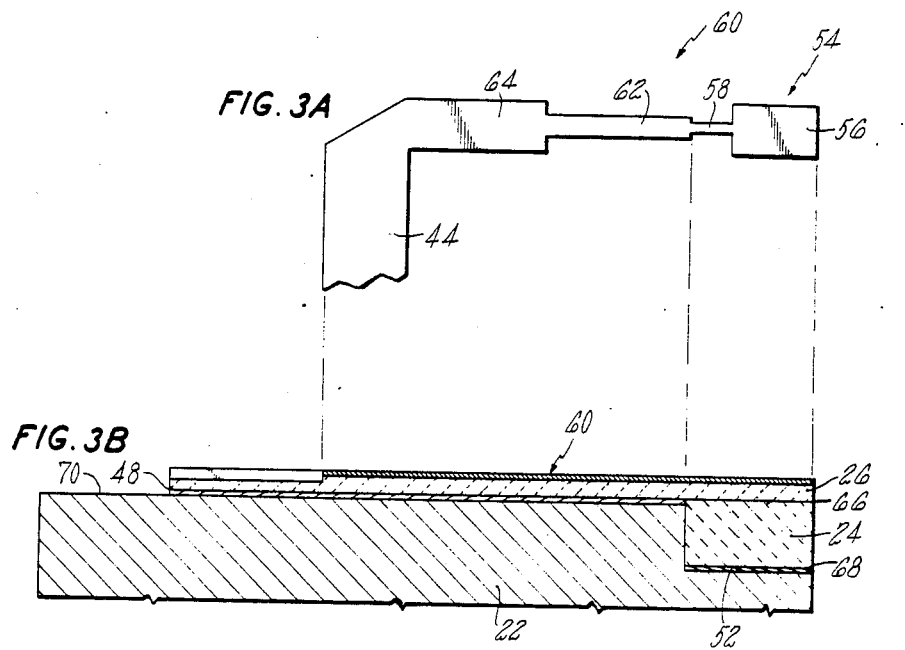

BROADBAND INFRARED ELECTRO-OPTIC MODULATOR HAVING A BURIED MICROSTRIP NETWORK

The invention described herein was made in the performance of work under NASA Contract No. NAS 1-16904 and is subject to the provisions of Section 305 of the National Aeronautics and Space Act of 1958 (72 Stat. 435; 42 U.S.C. 2457).

CROSS REFERENCE TO RELATED APPLICATIONS

The subject matter hereof is also disclosed and some of it is claimed in a commonly owned copending U.S. patent application filed on even date herewith by Robert A. Wagner et al, Ser. No. 720197, dated Apr. 4, 1985, entitled BURIED MICROSTRIP NETWORK PROCESSING.

DESCRIPTION

Technical Field

This invention relates to electro-optic devices and more particularly to broadband infrared microwave modulators having a buried microstrip network.

BACKGROUND ART

Optical waveguides that provide modulation of a propagating infrared laser signal are well known in the art. These devices rely on the electro-optic properties of bulk or thin film crystals to produce a change in refractive index of a traveling or standing microwave field inside the guiding crystal. The material must be a single crystal. The index of refraction of the waveguide material will vary in response to a microwave signal coupled into the waveguide, resulting in phase shift modulation of the propagating infrared beam. The phase shift modulation creates a power conversion of a portion of the infrared carrier signal into optical sideband signals.

Broadband modulation demands efficient coupling of microwave and optical fields into the waveguide. Moreover efficient interaction between these waves requires proper synchronization of the optical and microwaves such that each wavefront possesses nearly the same phase velocity. The modulated infrared beam is comprised of an input carrier frequency and the first order upper and lower sideband frequencies produced by the modulating microwave signal. Each sideband occurs within a modulation bandwidth defined as the frequency range of the optical sideband signals between the minus 3dB or half power points.

The electric field intensity required within the waveguide is such that conventional bulk electro-optic crystal modulators demand extremely high input power levels. Planar waveguide modulators fabricated from thin film electro-optic crystals have markedly improved conversion efficiencies. The same depth of modulation can be obtained with a lower modulation power as the cross sectional area of the electro-optical crystal decreases.

The planar waveguide modulators of the prior art include both standing wave and traveling wave microwave ridge modulators, as reported in an article entitled "Microwave Modulation of $CO_2$ Lasers and GaAs optical waveguides by P. K. Cheo and M. Gilden, *Applied Physics Letters*, Vol. 25, No. 5, Sept. 1, 1974, pp. 272-274, and "Thin Film Waveguide Devices" by P. K. Cheo, *Applied Physics*, Vol. 6, pp. 1-19 (1975). These devices lack intimate electrical contact between the electrode surface of the ridge and the surface of the waveguide. Air gaps between these surfaces result from imperfect fabrication and degrade the broadband impedance match between the output impedance of the microwave source and the effective input impedance of the microwave ridge waveguide.

Additionally, the air gap causes an increase in the velocity of propagation of the microwave signal in the interaction region, since the air gap and the waveguide create a composite medium with an index of refraction less than that of the waveguide itself. This results in increased nonsynchronization of the modulating signal with the optical wave and a degradation of modulator performance.

Other devices have been developed that comprise an integrated modulator structure in which the microwave electrodes are electroplated directly on the top and bottom surfaces of a thin film optical waveguide. Although thse devices provide for greater conversion efficiency, these planar devices suffer from degradation in the optical coupling efficiency and the inability to provide more exact confinement of the optical wave through the modulation field. This results in optical distortion in the modulated wave and less than fully realizable conversion efficiency.

An improvement in these planar devices was presented in U.S. Pat. No. 4,208,091 entitled BROADBAND MICROWAVE WAVEGUIDE MODULATORS FOR INFRARED LASERS, issued to P. K. Cheo and M. Gilden. The structure of these modulators comprise a non-coplanar thin film optical waveguide wherein the guided laser propagation path includes a ridge raised from a planar surface of the device. In some embodiments, these devices additionally contain a dielectric pedestal typically comprised of GaAs that is raised from the planar surface and the ridge region. The pedestal enables wider, more easily fabricated impedance transformer electrodes to be employed.

While these structures overcome many of the shortcomings of the earlier devices and provide greater bandwidth and better frequency response, the complex three dimensional topography of these devices requires extraordinary precision and elaborate fabrication techniques. Consequently, the yield of these devices remains low and performance characteristics of individual devices have not been sufficiently uniform. In addition, maintaining reliable operation at high power levels has proved to be very difficult with these devices.

DISCLOSURE OF INVENTION

An object of the present invention is to provide buried microstrip structures suitable for use in broadband infrared electro-optic modulators.

According to the present invention, a buried microstrip electro-optic modulator includes a waveguide having a thickness and having first and second surfaces that enclose a guide region and a microwave launcher region. The first surface has a ridge thereon that defines a guide path within the guide region which provides for guided propagation of the laser signal therein. The guide region of said second waveguide surface has a conductive coating thereon. In addition, a metal network electrode is included and comprises a microstrip electrode disposed on the ridge and launching transformers connected on each end of the network electrode. The transformers are disposed on the microwave launching region of the first waveguide surface for receiving and trasmitting the microwave signals. The modulator also includes a dielectric wafer having a width and thickness for providing microwave power dissipation that has first and second wafer surfaces, with the first wafer surface having a conductive coating thereon. The wafer is bonded along the second wafer surface to the second waveguide surface in registration with the microwave launcher region, forming an assembly. Additionally included is a metal base adapted to receive the assembly.

According to another aspect of the present invention, the assembly is bonded to the metal base along the coated second waveguide surface and coated first wafer surface.

BRIEF DESCRIPTION OF THE DRAWINGS

FIGS. 3a, 3b include a sectioned illustration of a portion of the modulator of FIG. 1 and a drawing of the network electrode thereon.

BEST MODE FOR CARRYING OUT THE INVENTION

Figure 1:
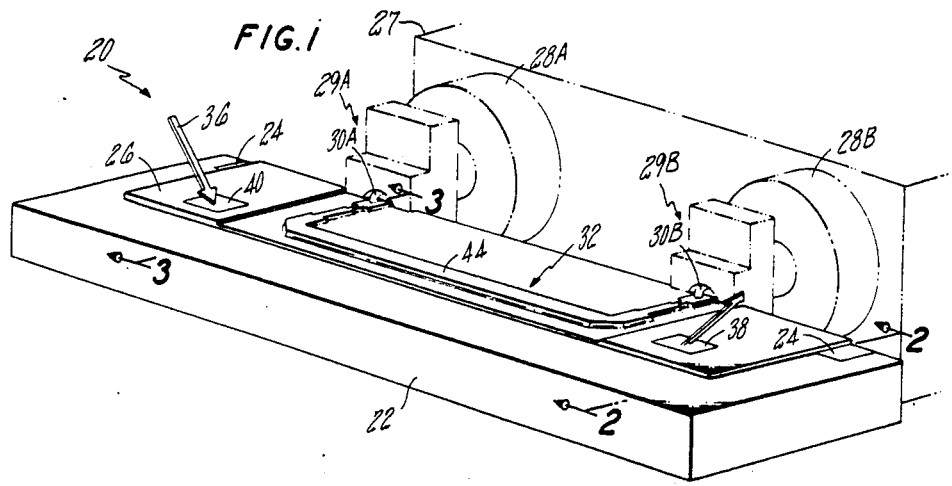
FIG. 1 is a perspective illustration of a buried microstrip infrafred modulator according to the present invention.

Referring first to FIG. 1, a buried microstrip infrared modulator 20, according to the present invention, includes a metal base 22, a dielectric wafer 24, and a thin film waveguide 26. The dimensions of the various components shown in FIG. 1 have been exaggerated for illustrative purposes.

A conventional microwave signal generator 27 (which is shown in phantom, and is not part of the present invention) provides mirowave signals through microwave terminals 28A, 28B and launchers 29A, 29B. In the best mode the signal generator comprises a frequency synthesizer with a high power broadband traveling wave tube amplifier operating in the Ku and X bands. Center conductors 30A, 30B of the launchers 29A, 29B, launch the microwave energy along microstrip network electrode 32. The launcher has a flat planar interface with the network providing intimate contact between the microwave terminal and the electrode.

In response to the microwave energy, an electric field is established within the waveguide structure itself, with the most intense electric field induced in that portion of the waveguide in register with the microstrip electrode. The field produces in a periodic change in the index of refraction of the waveguide material. Microwave terminal 28B provides a path via launcher 30B to an appropriate non-reflecting signal termination for the microwave signals. Since microwave launchers 30A, 30B are of a broadband design and correctly terminated only a forward traveling wave will exist in the modulator. Those skilled in the art will note that the direction of propogation of the microwave and optical signals must be the same. If the direction of propogation of the optical signal is reversed in the modulator of FIG. 1, then the microwave signal source and return terminals must be reversed.

A coherent infrared source (not shown and not part of the present invention) such as a $CO_2$ or equivalent laser provides optical signal 36. The signal is coupled into and subsequently out of the modulator by the use of coupling prisms (not shown) that are located on optical regions 38 and 40. The preferred prism couplers may be right angled germanium prisms of a type known in the art having prism geometry selected to provide excitation of the lower order $TE_0$ and $TE_1$ optical propagation modes within the guide. As described hereinafter with respect to FIG. 2, the thickness and geometry of the waveguide is chosen such that the propagation of the laser beam through the waveguide is limited to a guided mode.

The periodically changing index of refraction of the waveguide material provided by the applied microwave signal generates phase shift modulation of the laser beam propagating through the waveguide. Phase shift modulation of a propagating $CO_2$ laser beam and microwave frequencies with linear polarization generates both upper and lower sideband frequencies which can subsequently be resolved from the laser signal. Tuning of the sideband frequency over a finite range is possible by varying the microwave frequency.

Efficient broadband modulation of the optical carrier requires both optimized synchronization between the traveling microwave and traveling optical wavefronts and lateral confinement of the optical signal to the region of the waveguide where the microwave electric field is most intense. The microstrip structure of network electrode 32 is most effective, as it can be fabricated using photolithographic techniques well known in the art, and produces electrodes of the desired accuracy. However, the difficulty of proper impedance matching is increased when a microstrip network is used in conjunction with a waveguide as thin as is required. In order to allow sufficiently rugged electrodes to be employed, step a change in the thickness of a portion of the waveguide is introduced. As hereinafter described with respect to FIG. 2, dielectric wafer 24, which comprises a thin wafer of gallium arsenide (GaAs) in the best mode embodiment, is recessed into the metal block and is in registration with the microwave terminal contact portion of the network.

The network electrode is located on a ridge (42, FIG. 2) on the surface of the waveguide that is fabricated by techniques known in the art. The difference in index of refraction presented by the air surrounding the ridge is sufficient to laterally confine the laser signal to that portion of the waveguide in registration with the ridge. In the best mode embodiment the ridge is formed by removing several microns of waveguide material adjacent to the network electrode. Those skilled in the art will note that the ridge need only be provided for a portion of the network electrode, microstrip electrode 44, which is colinear within the optical signal guide path within the waveguide.

Figure 2:
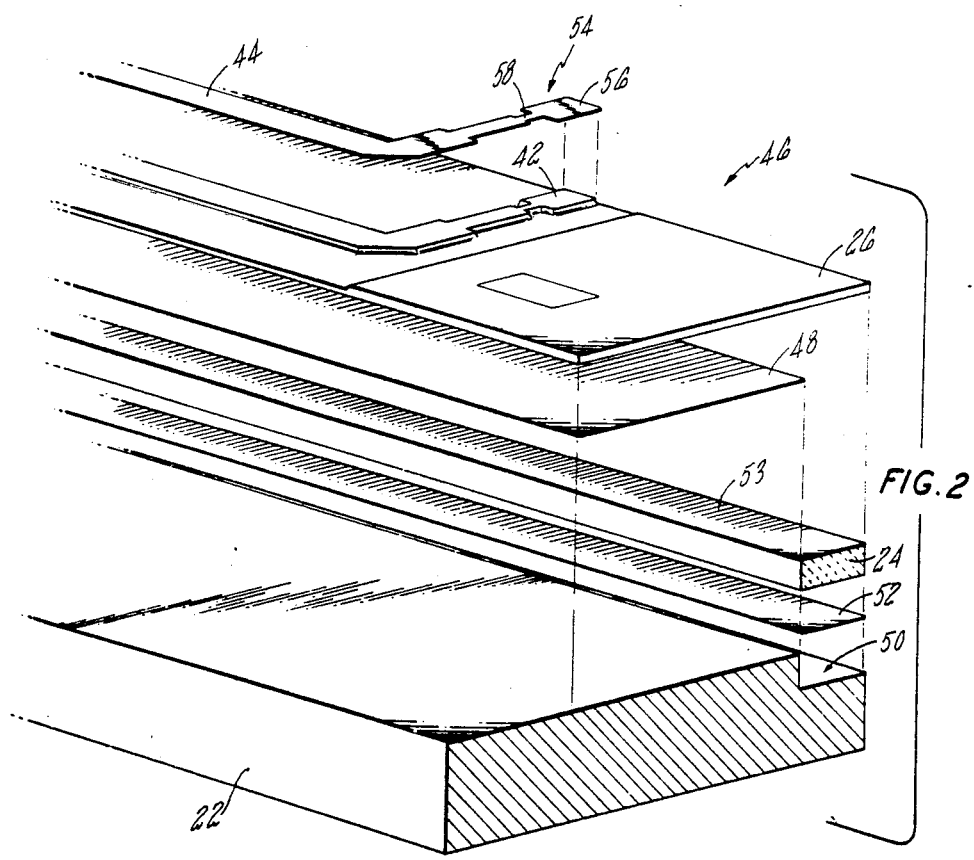
FIG. 2 is an exploded, sectioned illustration of a portion of the buried microstrip modulator of FIG. 1.

FIG. 2 is an exploded perspective illustration, partially in section, taken along the section 2—2 of FIG. 1. The microstrip modulator's metal base 22, waveguide 26, and dielectric wafer 24 are illustrated in detailed relationship. The metal base comprises copper in the best mode embodiment, but other metals such as molybdenum may be substituted. Microstrip network electrode 32 is fabricated on the top surface of the waveguide by conventional photolithographic techniques comprising materials and geometry detailed hereinafter in FIG. 3.

The material used to fabricate the waveguide may be any infrared, electro-optic material. Gallium arsenide (GaAs) and cadmium telluride (CdTe) are the two most commonly used but those skilled in the art will recognize that other equivalent materials may be substituted. In the best mode embodiment the waveguide is fabricated from a large area (3 inch×3 inch) gallium arsenide wafer. Gallium arsenide is electro-optically active. Moreover, the depth of modulation of the index of refraction provided by a given applied electric field amplitude varies with different crystallographic orientations. In the best mode embodiment, the (001) crystallographic direction is selected to be perpendicular to the electric field vector. A waveguide fabricated with this orientation displays guided wave modes with low propagation losses and is also preferred for chemomechanical polishing performed during fabrication. Those skilled in the art will recognize that other orientations can be substituted.

The waveguide dimensions including the length, width and thickness are selected in dependence on the wavelength of the infrared laser to be phase modulated. The modulator of FIG. 1, fabricated according to the present invention, is described dimensionally in terms of a broadband modulator for a 10.6 micron wavelength $CO_2$ laser. Those skilled in the art will recognize that other infrared lasers operating at different wavelengths may be substituted. Any difference in laser wavelength may result in changes to the values of the waveguide's dimensions.

In the best mode embodiment, the length of the waveguide is approximately 5 centimeters and the width is on the order of 1 millimeter. The thickness is chosen to be approximately one or two wavelengths of the infrared signal, providing for guided mode propagation of the laser signal. For a 10.6 micron $CO_2$ laser used in the best mode the modulator thickness should be between 10 and 25 microns.

The major surfaces of the waveguide, both top and bottom, should be parallel. Consequently, the waveguide's final thickness must be uniform to within approximately 1 micron. Additionally, metal layer 48 is plated on that portion of the waveguide which abuts the copper base, and, in the best mode embodiment, comprises a copper layer of 5 microns. Those skilled in the art will recognize that other metal layers, such as one of molybdenum, gold or aluminum at selected thicknesses can be substituted.

Wafer 24 is located in channel 50 which is recessed into the copper base. The waveguide is affixed to the base by any suitable bonding means, and in the best mode embodiment comprises a layer of Epotek 353 ND low viscous epoxy, 1 to 2 microns thick. The wafer, which in the best mode embodiment comprises gallium arsenide, provides microwave power dissipation and, as described hereinafter with respect to FIG. 3, enables the microstrip network electrode 32 to be fabricated with larger absolute widths at the desired width ratio than would otherwise be possible. Those skilled in the art will recognize that other equivalent materials can be substituted.

Additionally, metal layer 52 which comprises copper or an equivalent is deposited on the major surface of the wafer that is in contact with the bottom surface of the channel. The metallized wafer surface is bonded to the bottom of the channel with an appropriate bonding material, such as a 1 to 2 micron thick layer of Epotek 353 ND epoxy. In addition, the wafer includes top surface 53.

It is well known in the art that the impedance of a microstrip network can be adjusted by varying the width of the microstrip electrode. Moreover design procedures for broadband microwave impedance transformers have been well established by L. Young in "Tables for Cascaded Homogenous Quarterwave Transformers", IRE Transactions MTT-7, p. 33 (1959). A serious problem develops when the waveguide thickness is on the order of 25 microns. In order to match the 50 ohm impedance presented by the microwave terminals (28, 34 FIG. 1) the electrode width must be reduced to below 25 microns. At this width the electrode is very fragile and not suitable for high power operation.

A wider and more rugged electrode can be fabricated by integrating the gallium arsenide wafer into the modulator structure. The wafer is buried beneath the waveguide in the metal base. The presence of the buried wafer results in an effective step in the thickness of the waveguide.

The step in thickness causes a perturbation in the microstrip impedance and introduces an additional parasitic shunt capacitance. A reduction in the overall bandwidth of the modulator can be avoided if the step discontinuity presented by the wafer is integrated into the design of transformer 54 and a complementary transformer at the other end section of the modulator. In the best mode embodiment the transformer 54 comprises contact pad 56 and narrowed section 58. The buried gallium arsenide wafer has a width approximately equal to the width of the first transformer in the microstrip network.

In addition, the thickness of the wafer influences the value of the parasitic shunt capacitance of the modulator. The thickness of the wafer is dependent on the absolute thickness of the waveguide and the selected widths of the impedance transformers as well as the dimensions of the contact pads of network electrode. For a network electrode having dimensions hereinafter detailed in FIG. 3, and a waveguide thickness of approximately 25 microns a ratio of 10:1 wafer to waveguide thickness is selected. In the best mode embodiment a waveguide thickness of approximately 25 microns yields a wafer with a thickness of 250 microns. The shunt capacitance introduced by the wafer increases with increasing thickness ratio. Thickness ratios greater than 10:1 in the modulator of FIG. 1 display an increase in insertion loss in the upper frequency range and a reduction in the bandwidth of the modulator.

The geometry of the wafer, the base and of the channel thereon can be obtained by methods known in the art. In the best mode embodiment the processes used to fabricate the hereinabove mentioned structures are described in a commonly owned copending U.S. patent application filed on even date herewith by Robert A. Wagner et al, Ser. No. 720,197, entitled BURIED MICROSTRIP NETWORK PROCESSING.

FIG. 3a illustrates a portion 60 of the microstrip network 32 of FIG. 1. The illustrated portion shows the impedance transformer 54 as including contact pad 56 and narrowed section 58, and also the additional microwave impedance matching transformers 62 and 64, as well as a section of microstrip line 44.

The very small dimensions of the modulator of FIG. 1 are a consequence of the need to minimize the amount of microwave power required for the desired modulation. The optimum modulator cross section can be derived from a simple model with the assumption that a uniform distribution of the microwave field exists in the active region. The microwave power in that region can be expressed by $$P_m = \frac{E_m^2}{Z_o} tW \sqrt{\epsilon_1}$$

where $Z_o$ is the plane wave characteristic impedance of free space, $E_m$ is the field amplitude of the microwave signal, t is the thickness and W is the width of the active region, and $\epsilon_1$ is the permeativity of the waveguide material. The dimensions of the active region of the waveguide must be chosen as small as possible to minimize the power required. As a result the value of the characteristic impedance of the waveguide becomes relatively low, and proper impedance transformers must be designed to provide broadband impedance matching. The characteristic impedance of the microstrip electrode (44, FIG. 2) of the modulator made according to the present invention is approximately 2.7 ohms. Effective coupling of the microwave energy into the modulator requires that this impedance be matched to the higher transmission line impedance of 50 ohms.

As is well known in the art, the electrode width cannot be reduced indiscriminately. As the width decreases and approaches the waveguide thickness dimension, the effective phase velocity of the propagating microwaves begins to change significantly because of the effects of fringing fields. The modulation efficiency of the modulator strongly depends on the degree of synchronization between the propagating optical and microwave fronts. Therefore, the modulation efficiency ultimately depends on the width of the electrodes.

As is well known in the art, efficient coupling of the microwave energy is provided by several quarter wavelength step impedance transformers that are cascaded to match the 50 ohm transmission line impedance and the impedance of the modulator. Techniques for designing these broadband microstrip impedance transformers are well known in the art, as hereinbefore noted in the L. Young reference. The width of the metal line fabricated on the waveguide determines the impedance thereof. Therefore, the width ratio between the transformer sections provides the desired impedance matching.

In the best mode embodiment the first impedance transformer which comprises contact pad 56 and narrowed section 58 has a contact pad with a width of 0.6 millimeters and a length of 0.9 millimeters. Narrowed section 58 has a length of 0.51 millimeters and a width of 0.12 millimeters. Transformer 62 has a length of 1.68 millimeters and a width of 0.18 millimeters and transformer 64 has a length of 1.59 millimeters and a width of 0.6 millimeters.

FIG. 3b is a sectioned illustration of the modulator of FIG. 1 through a portion of microstrip segment 60. FIGS. 3a and 3b together illustrate the position of the microstrip network relative to the modulator components in the best mode embodiment. It should be noted that the dimensions and scale have been exaggerated for illustrative purposes.

FIG. 3b illustrates copper base 22, microstrip segment 60, waveguide 26 and dielectric wafer 24. Additionally included is copper layer 48 bonded to a portion of waveguide surface 66 and copper layer 52 bonded to wafer surface 68. As mentioned hereinbefore, the copper layers 48 and 52 are deposited on the surface of the waveguide and wafer respectively, by techniques known in the art, such as electroplating or ion beam plating. Those skilled in the art will recognize that other equivalent techniques may be substituted. As also noted hereinbefore, the bonding substance used to affix the wafer and waveguide together with the copper base may be any suitable means.

Note that FIGS. 3a and 3b together illustrate the relationship between the wafer and the first impedance transformer. The wafer is positioned to be in registration with the first impedance transformer and to provide the wafer top surface to be essentially coplanar with copper base surface 70. The hybrid surface presented by copper surface 70 and the wafer surface should be essentially optically flat. In addition the copper layer which is affixed to the waveguide is in registration with the copper base, and should not cover that portion of the waveguide which is in registration with the wafer. From FIG. 3b it can be observed that the position of the wafer relative to the first impedance transformer relative to the waveguide effectively defines two regions of the waveguide. A microwave launcher region comprises that portion of the waveguide in registration with the wafer and the first transformer. The remainder of the waveguide including the guide path underneath the microstrip electrode comprises the guide region.

Similarly, although the invention has been shown and described with respect to a best mode embodiment thereof, it should be understood by those skilled in the art that various other changes, omissions and additions thereto may be made therein without departing from the spirit and scope of the invention.

We claim:

1. An electro-optic modulator for modulating an infrared laser signal with a microwave signal, in a system having a laser signal source and a microwave signal source, comprising:

a thin-film optical waveguide, having first and second major surfaces spaced apart at a waveguide thickness, for providing a laser signal guide region and a microwave launcher region therebetween, said first major surface having optical coupling means disposed thereon at opposite ends of said guide region, said guide region providing guided propagation therethrough of laser signals presented from the laser signal source to said coupling means, said second major surface having a metallization layer disposed along that surface portion thereof which is coincident with said guide region;

a microstrip electrode, disposed on said first major surface in register with said guide region, and having launching transformer electrodes at each end thereof, said transformer electrodes being disposed on said first major surface in register with said microwave launcher region, for coupling microwave signals from the microwave signal source to the microstrip electrode; and metal substrate means, having a substrate surface adapted to receive said waveguide second major surface;

as characterized by said substrate surface including a channel portion formed therein in register with said microwave launcher region; said modulator further comprising dielectric wafer means, having first and second wafer surfaces spaced apart at a wafer thickness, said second wafer surface having a metallization layer disposed thereon and being bonded along said metallization layer to said substrate channel, said first wafer surface being bonded to said waveguide second major surface in register with said microwave launcher region, whereby said dielectric wafer means provides dissipation of the microwave signal power provided by the microwave signal source to each said launching transformer electrode.

2. The modulator of claim 1 wherein said waveguide second major surface metallization is bonded to said layer substrate surface.

3. The modulator of claim 1, wherein said waveguide second major surface metallization and said second wafer surface metallization comprise copper.

4. The modulator of claim 1, wherein said waveguide second major surface metallization and said second wafer surface metallization comprise molybdenum.

5. The modulator of claim 1 wherein said waveguide means comprises gallium arsendide.

6. The modulator of claim 1, wherein said wafer means comprises gallium arsenide.

7. The modulator of claim 1, wherein said wafer thickness is approximately ten times said waveguide thickness.

* * * * *